United States Patent [19]
Besancenot

[11] 3,809,470
[45] May 7, 1974

[54] PROJECTOR
[76] Inventor: Serge Besancenot, 5 rue E. Sylvestre, Sevran, France
[22] Filed: June 4, 1971
[21] Appl. No.: 150,120

[30] Foreign Application Priority Data
June 5, 1970 France .............................. 7020813

[52] U.S. Cl. ................................................ 353/113
[51] Int. Cl. ............................................ G03b 23/02
[58] Field of Search ................ 353/113, 114, DIG. 1

[56] References Cited
UNITED STATES PATENTS
3,258,867  7/1966  Hall .................................... 353/116
3,273,454  9/1966  Bast .............................. 353/DIG. 1

FOREIGN PATENTS OR APPLICATIONS
1,435,924  3/1966  France ............................. 353/116
655,589   7/1951  Great Britain ................ 353/DIG. 1
980,848   1/1965  Great Britain ................ 353/DIG. 1

Primary Examiner—Louis R. Prince
Assistant Examiner—A. J. Mirabito
Attorney, Agent, or Firm—Waters, Roditi, Schwartz & Nissen

[57] ABSTRACT

A slide projector in which a magazine for photographic slides is located in a tunnel arranged parallel to the projection axis and a pusher member is transversely movable to displace a slide at the projection station from the magazine to a projection position on the projection axis and vice versa. An elastically deformable leaf spring is positioned in the tunnel such that the stack of slides to be projected is initially therebehind, and the leaf spring shifts the slides one at a time after they have been projected to a position in front of the leaf spring.

6 Claims, 14 Drawing Figures

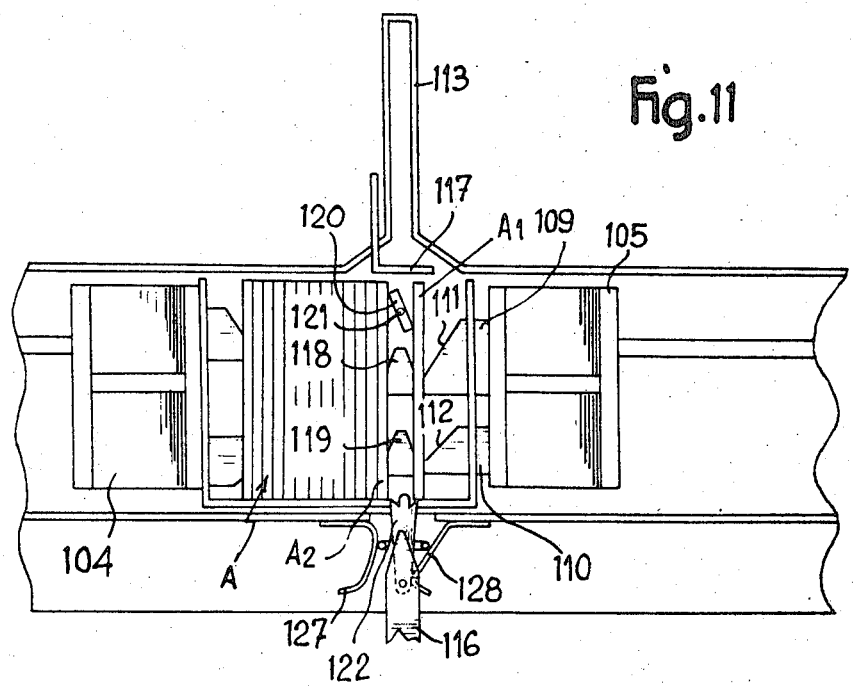
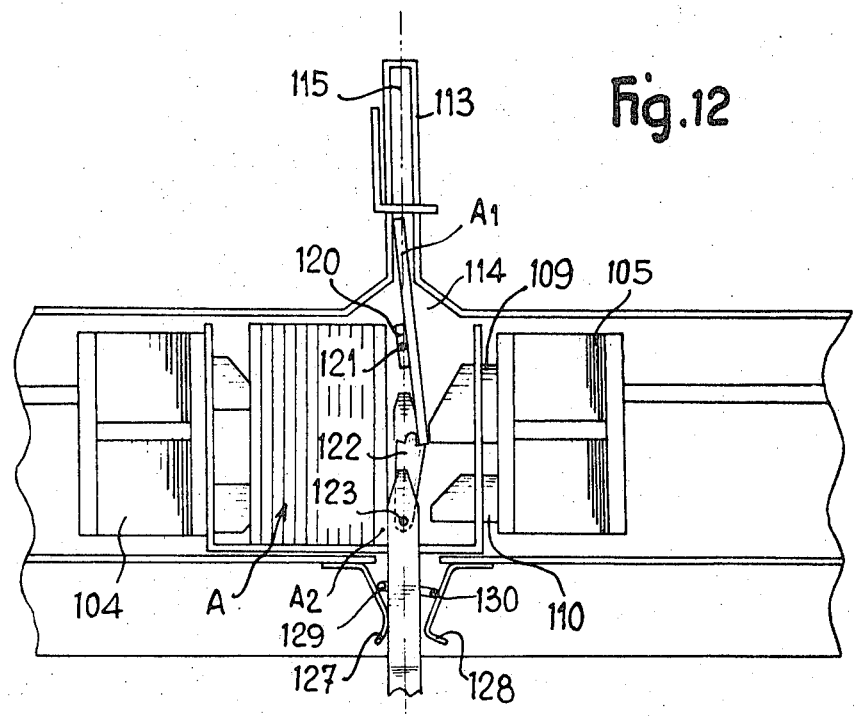

PROJECTOR

The present invention relates to a projector in particular one for slides in which a pusher member having a transversal to-and-fro movement successively selects each of all the slides from one group, locates it within the optical projection device and then replaces it with the others in another group.

There are at present two types of slide feeder arrangement for such projectors. In the first, the slides are disposed individually in holders, comprising a slot for each slide, and gearing of the rack and pinion type which advances the holder step by step in such a way as to cause each slide to pass in front of the pusher member. This system appears to be reliable, yet at the same time it is complex and therefore costly. In addition, the means for containing the slides is very bulky, each slide occupying a large space in its slot within the holder.

In the second the slides are arranged loosely as received from development, in the tunnel intended to take the abovementioned holder. A presser member pushes them against the plane of projection, and each slide arriving in this plane is selected by the transverse pusher member, located within the projection area, and withdrawn to the area in front of this plane, by means of a shunting arrangement which comprises: an elastically deformable leaf folded along a vertical angle, convex towards the front of the projector, fixed at one end and free at the other end, so that it deforms flexibly to a point near the projection area, and on the other hand a fixed stop, similarly folded along a vertical angle, so that each slide in the course of its displacement is subjected to the following two movements: (a) the displacement of the pusher member from the exterior towards the projection position, whereupon the slide, pushed sideways and directed by the fixed stop, causes the leaf to yield forwards in order to take up its projection position. (b) displacement in the opposite direction, whereupon the slide, guided by the extension of the flexible leaf in the projection area, causes the said leaf to yield backwards, and passes in front, unhindered by the fixed stop.

This latter system is more simple and less costly, but has the following two related disadvantages: the shunting function rests with the flexible leaf only because it extends itself to a point near the projection area, so that when the slide locates in the projection position, its corresponding end springs behind the slide, which is then directed and guided forwards to the "projected" pile. - Consequently, the leaf constitutes a transverse obstacle to any loading device containing the slides, which latter must therefore be loaded and unloaded loosely by hand.

Such obligatory handling is therefore unsuitable since it prevents the use of loading devices serving at the same time as filling boxes and risks damaging the slides.

An attempt has been made to overcome this drawback by the use of a couple of stationary loading magazines, one full and the other empty, the slides from one being progressively filled into the other, which means that such loading magazines cannot be used for filing the slides, since no means of identification can be applied to them.

The present invention sets out to provide a new system of shunting which allows of the use of moving loading magazines containing loose slides. In accordance with the invention, a single loading magazine is displaced at the same time as the slides, which ensures that it can be used for the classification and storage of the slides, as well as for their instant location in the projector.

To this end, the object of the invention is a projector for slide photographs of the type which comprises a tunnel for the photographs, parallel to the projection axis, a pusher member having transversal movement in relation to the tunnel opposite a slide stage, a means of shunting the photographs from one side to the other of the axis of the pusher member according to the displacement direction of the said pusher member, the said means comprising an elastically deformable leaf having a vertical fold which yields forwards elastically under the pressure of a slide taking up its projection position, then which when freed falls back into place, lying behind the slide when the latter is making its return movement, characterised in that the said leaf is disposed entirely within the tunnel which receives a loading magazine containing the said slides, and stops at a certain distance from the sides of the said tunnel.

Preferably the projector comprises a stop in the form of a locating edge having a vertical angle which is elastically mounted about an axis which is also vertical, in such a way as to yield backwards elastically under the pressure of a slide taking up its projection position, then having regained its rest position, pushes the said slide forwards in such a way as to place it in front of the leaf, behind the slides which have already been projected, when the slide is making its return movement.

Preferably, the elastic leaf and the stop are composed of a single member which is mounted pivoting about a vertical axis located within the axis of the pusher member and inside the tunnel and which is elastically recalled to a position in which a vertical face is situated diagonally in relation to the axis of the pusher member.

In accordance with one feature of the invention, the single member is composed of a small plaque the larger sides of which are vertical, and which is symmetrical about its axis, the said plaque being connected to a control mechanism having two positions of which one corresponds to the displacement of the plaque towards the front of the tunnel, and the other to the displacement of the plaque towards the back of the tunnel in relation to the axis of the pusher member, the elastic recall of the plaque being selectively either towards the front or towards the back, while the pusher member comprises an arm which pivots on the said pusher member on a vertical axis itself within the axis of the pusher member and which is elastically recalled to a position which is diagonal in relation to the axis of the pusher member, the said arm being connected to a control mechanism having two positions of which one corresponds to the displacement of the arm towards the front of the tunnel, the other to the displacement of the arm towards the back of the tunnel, the said mechanism being preferable synchronised with the control mechanism of the plaque.

In accordance with one feature of the invention, the control mechanism of the plaque and/or the control mechanism of the arm both comprise two spring plates each of which has one end fixed to the projector frame and the other free to act upon the plaque or the arm and each of which controls one direction, and a movable fork connected to a control button having two positions of which one corresponds to both the cancellation of the first spring plate and the action of the second, while the other position of the fork corresponds to both the action of the first spring plate and the cancellation of the second.

It should be noted, although this will be described in detail later, that as a result of the second embodiment and the corresponding complementary features, the projector possesses a "reverse" operation, which means that photographs which have already been projected and withdrawn can be brought back for reprojection.

The invention will be further described by way of non-limiting examples with reference to the accompanying drawings, in which:

FIGS. 7 to 11 are plan diagrams showing the operation of the projector according to another non-limiting embodiment according to the invention, the photographs being selected in a first direction styled "forward";

FIGS. 12 and 13 illustrate the operation in the opposite direction, styled "reverse";

Figure 1:
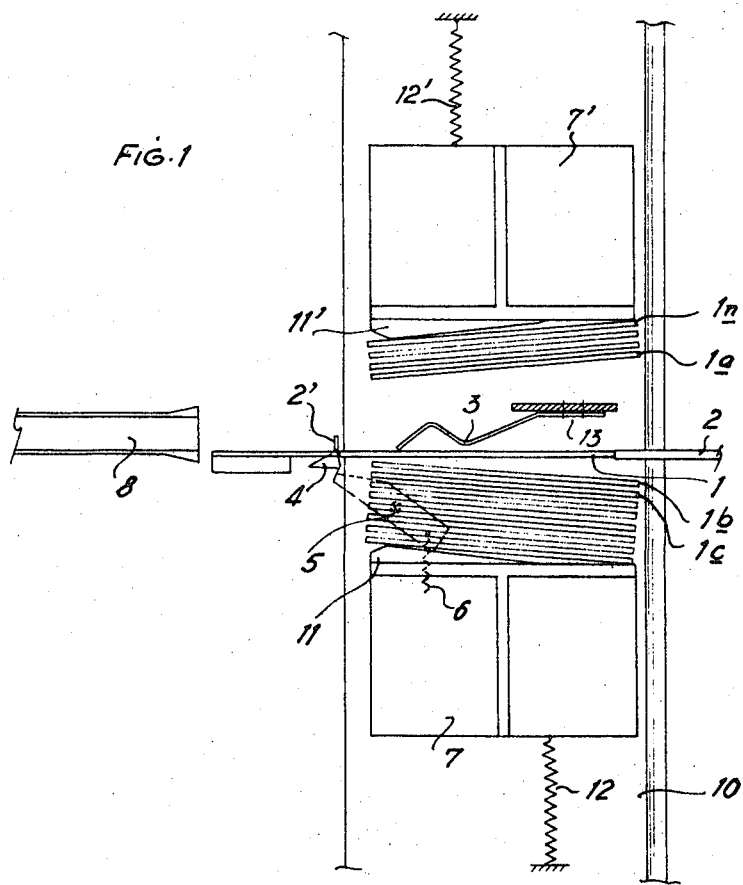
FIGS. 1,2,3 and 4 are diagrams representing the various stages in the passage of a slide photograph from a pile which is "to be shown" to a "shown" pile, as seen from above, according to an non-limiting embodiment according to the invention.

In FIGS. 1 to 5, the references relate as follows:
1 (1a, 1b, 1c..1) : slide photographs
2-2' : transversal pusher member
3 : elastically deformable leaf
4 : stop, hinged about an axle 5, acted upon by a return spring 6.
7-7' : pressing members
8 : slide retainer.

Figure 5:
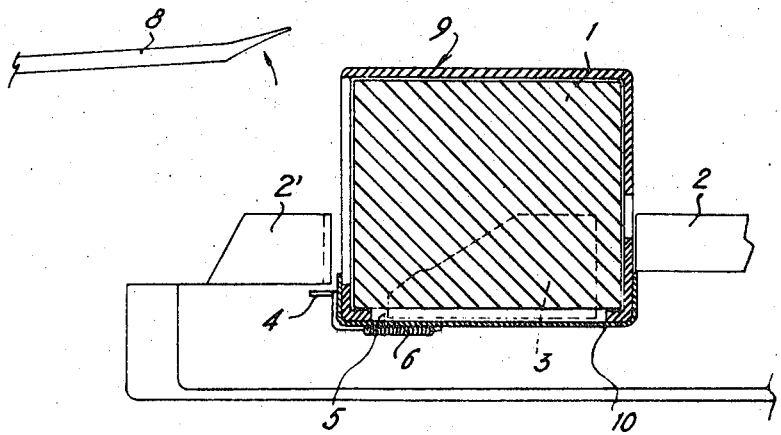
FIG. 5 is a vertical section through the plane of projection.
Figure 6:
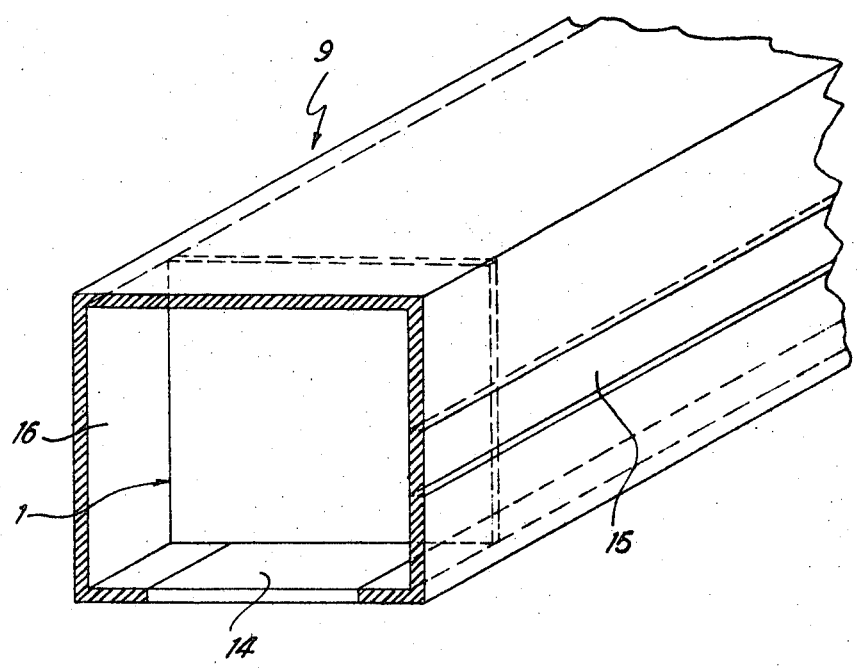
FIG. 6 is a perspective view of a loading magazine according to the invention.

In FIG. 5, the loading magazine of FIG. 6 is given the reference 9. Finally, the tunnel receiving the loading magazine 9, bears the reference 10.

To begin with, the projector is taken to be at rest, as shown in FIG. 1. A slide 1, one of a pile contained loosely in a loading magazine 9, is pushed against the leaf 3 by the pressing member 7, having as can be seen a ramp 11, and acted upon, as is 7', by the pressure of a spring (12').

Figure 2:
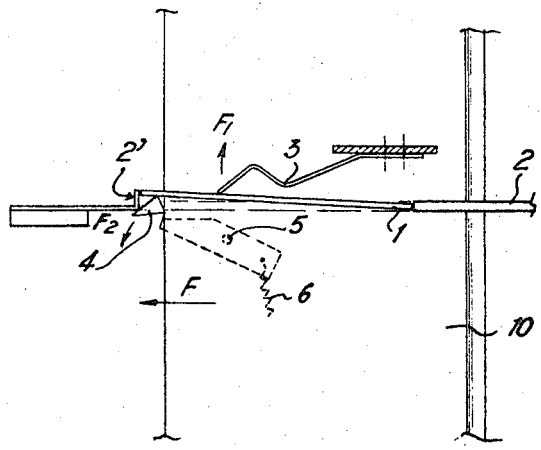
Figure 3:
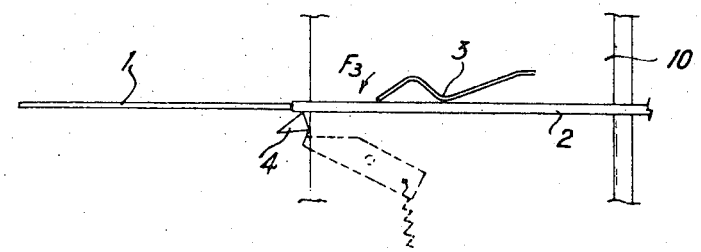
Figure 4:
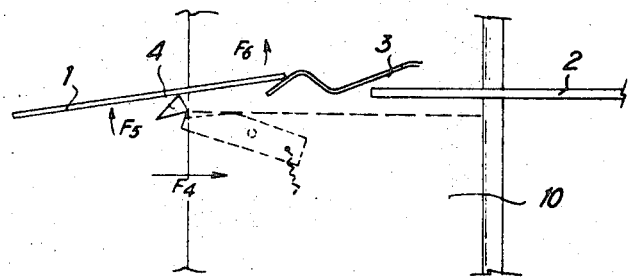

The pusher member 2-2' is then operated (manually or mechanically) in the direction F (FIG. 2). The slide 1 pushes the leaf 3, in the direction $F_1$ and the stop 4 in the direction $F_2$. The leaf 3, which is fixed at 13, is resiliently deformed by virtue of its elasticity, and the stop yields in opposition to the spring 6. The slide 1 then slips sideways to the left.

When the slide 1 arrives in the projection position (FIG. 3), the stop 4 is held in the same deflected position by the pusher member 2-2', while the leaf on the other hand has fallen against the said pusher member 2, as shown by the arrow F3.

The result is that when the pusher member 2-2' is displaced to the right (arrow $F_4$, FIG. 4), the stop 4 acted upon by the spring 6, exerts a thrust $F_5$, which causes the slide 1 to pass in front of the leaf 3, this movement being indicated by $F_6$.

The slide 1, having completed its journey, arrives at 1a, at the back of the pile of slides which have already been shown, and the slide 1b has taken its place. The situation is once again the same as in FIG. 1.

This system relies therefore on the effects of two elastic deformations, that of the leaf 3 and that of the stop 4, which are involved successively, instead of the single leaf of earlier systems. The result of these successive actions is the complete freeing of the tunnel 10, which remains unobstructed by any fixed member disposed laterally (bearing in mind that the pusher member 2-2' is a moving member which does not cause an obstruction).

Consequently it is possible to place the slides 1 in a loading magazine of the type bearing the reference 9, instead of having to load them and remove them by hand as in the earlier systems.

As shown in FIGS. 5 and 6, the loading magazine 9 rests on the bottom of the tunnel 10, and comprises a longitudinal horizontal aperture, which permits the free clearance of the leaf 3, a longitudinal vertical aperture 15 for the passage of the pusher member 2, and of course a longitudinal opening 16 permitting the to-and-fro displacement of the slides 1.

A loading magazine such as this is straightforwardly constructed since it consists of a single box. To ensure that the slides 1 do not fall out through the opening 16, an edge is provided which each successive slide can cross by means of a ramp in the tunnel 10.

According to a second feature, an elastic slide retainer 8 is provided to exert a slight downward pressure upon each slide when it is in the projection position.

With reference to FIGS. 7 to 14 now, another embodiment of the invention is illustrated which allows as before the passage of the photographs from the back to the front in relation to the axis of the pusher member and, in addition, the passage from the front to the back, termed "reverse" in such a way that it is possible to project again one or more photographs which have already been shown.

In this embodiment, the projector comprises a tunnel 101 parallel to the projection axis 102.

The tunnel 101 comprises two longitudinal apertures 103 serving as guides for the pressing members 104 and 105 which are acted upon by a spring (not shown) forcing them towards each other, and which is situated at the end of the tunnel 101.

The pressing member 104 comprises two thrust members 109 and 107 having one face perpendicular to the tunnel 101. The thrust member 106 comprises in addition, a slanting face 108.

The pressing member 105 comprises two thrust members 109 and 110 having one face perpendicular to the tunnel 101 and one slanting face 111 and 112 respectively.

On one of the sides of the tunnel there is a slide stage 113 the entrance to which 114 has converging walls which are symmetrical in relation to the axis 115. Disposed transversally in relation to the tunnel 101 and along the axis 115, is a movable pusher member more or less in the form of a U of which only the pusher bar 116 and the return stop 117 are shown.

Disposed along the axis 115 and on the bottom of the tunnel 101 are two fixed stops 118 and 119 having one edge which is pointed in the direction of the slide stage 113.

In front of the stop 118, a small plaque 120 is provided which pivots about a vertical axis 121 in relation to which it is symmetrical, the said vertical axis 121 lying on the axis 115.

On the bar 116 of the pusher member, there is provided an arm 122 which pivots about a vertical axis 123. The arm 122 has a ridge 124 and two grooves 125 and 126.

On either side of the pusher member, two spring plates 127 and 128 are affixed at one end to the vertical wall of the tunnel 101.

These plates which are suitably curved, can make contact with the side faces of the arm 122. They are either activated or cancelled by means of a movable fork having two vertical prongs 129 and 130.

The said fork is connected to a control button (not shown) in such a way that through the operation of the latter the fork is displaced in a direction which is parallel to the axis of the tunnel 101.

Figure 7:
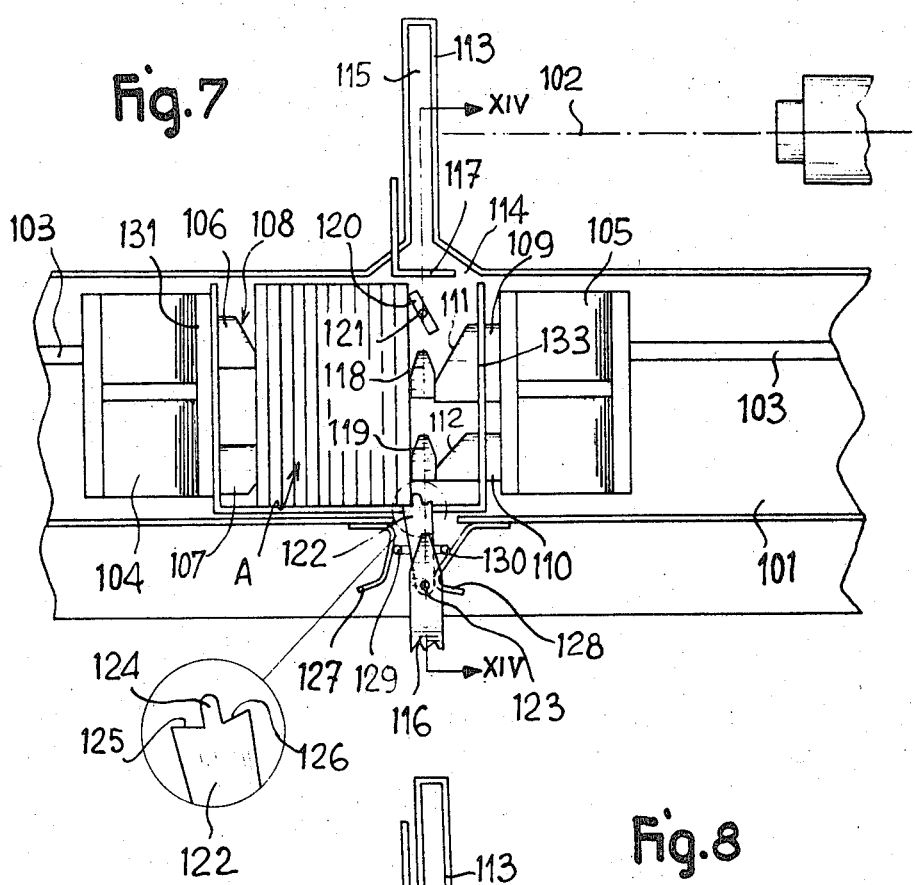
Figure 8:
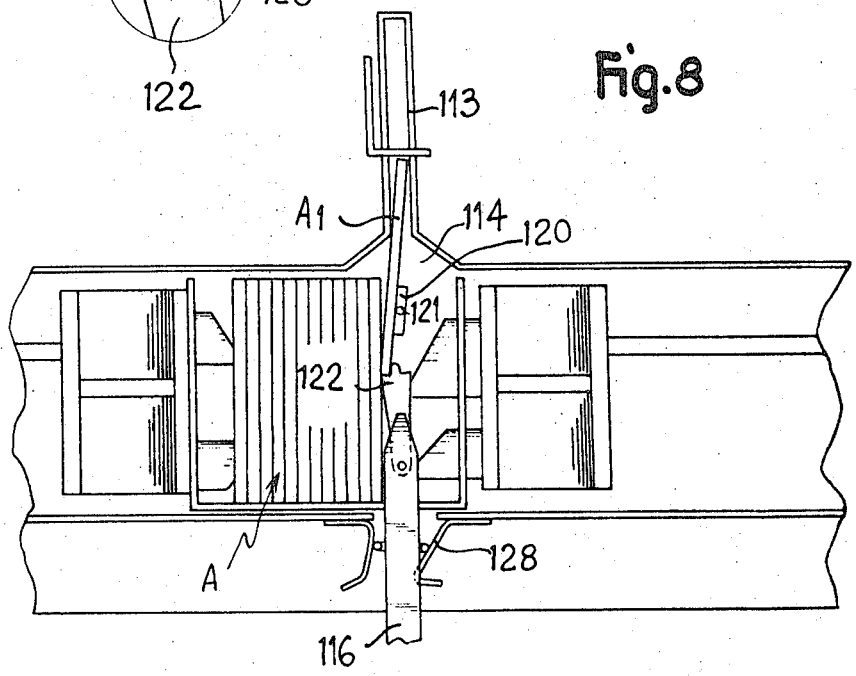

In the position illustrated in FIG. 7, the fork is displaced towards the left of the drawing. The prong 129 holds the plate 127 under pressure so that it cannot make contact with the arm 122. At the same time, the prong 130 leaves the plate 128 free to act upon the arm 122 so that it displaces the said arm towards the left.

In its other position, the fork is disposed to the right (FIGS. 12 and 13) so that the force of the plate 128 is cancelled and at the same time the plate 127 is in operation.

The advantage of these arrangements will be explained below.

Figure 13:
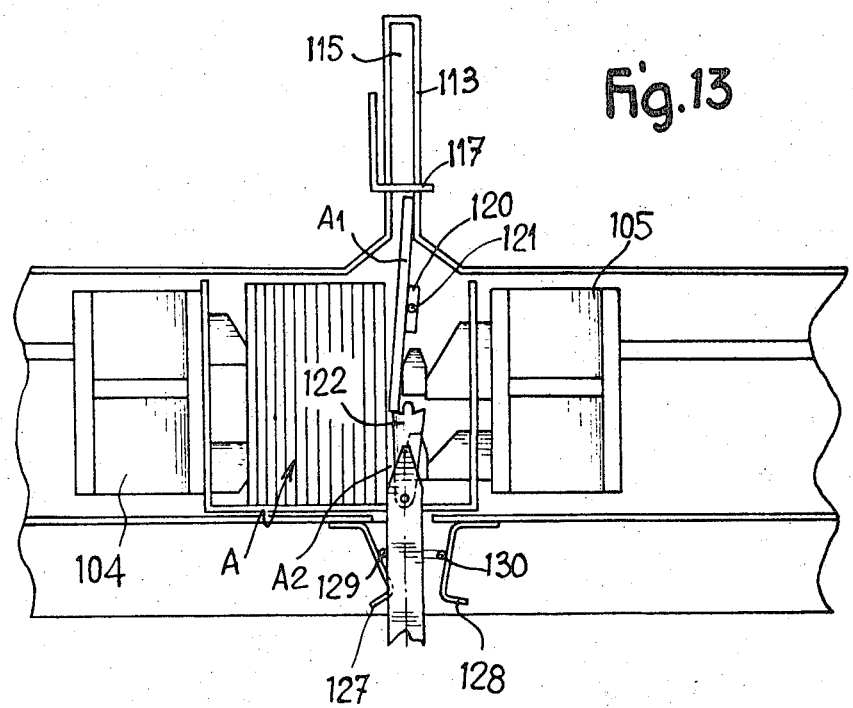
Figure 14:
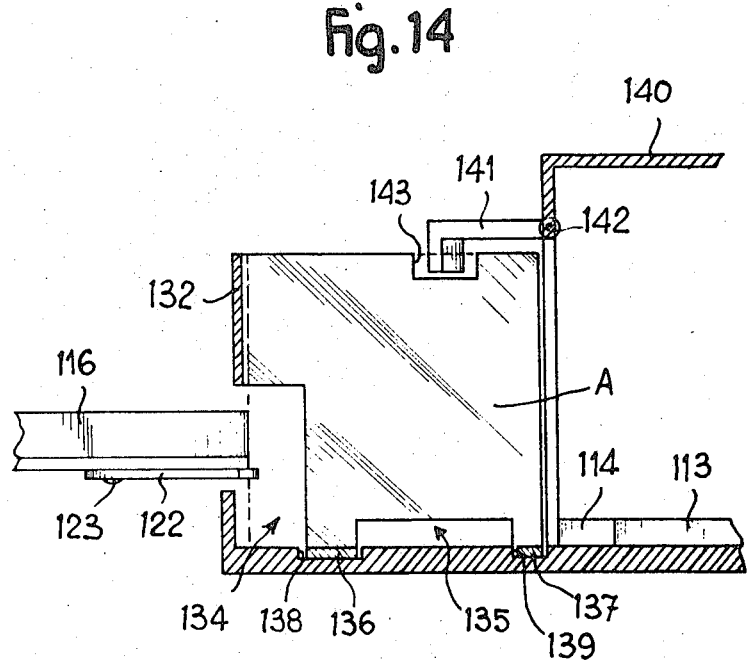
FIG. 14 is a section along the line XIV—XIV of FIG. 7.

The same mechanism is used for the plaque 120 so that depending upon the position of the control button, the plaque is tilted and elastically displaced to the left of the drawing (FIGS. 7, 8, 9, 10 and 11) or to the right (FIGS. 12 and 13).

The photographs to be projected A are placed loosely, that is to say one against the other, in a cassette comprising a bottom and a frame having three sides, 131, 132, and 133, the fourth side facing the slide stage being completely open.

The side 132 which is opposite the said slide stage is open along its whole length apart from the base in order to allow the passage of the pusher member 116, as is already known.

The two other sides 131 and 133 of the cassette (FIG. 14) have apertures 134 and 135 which allow the thrusts 106, 107, 109 and 110 of the pressing members 104 and 105 to act upon the frame of the photographs A, even when the cassette is not completely full.

The bottom of the cassette can to advantage be composed of two runners 136 and 137 which engage in two grooves 138 and 139 lying longitudinally along the tunnel 101 so as to provide a guide system as the cassette slides along the tunnel 101.

Behind the slide stage 113 is situated a casing 140 containing the projection lamp. On the said casing 140 there is provided a stop 141 which pivots about a horizontal axle 142.

This stop is designed to retain the first photograph to be projected, for which reason the side 133 of the cassette has a groove 143.

The operation of the projector which has just been described is as follows:

The cassette filled with photographs A is placed in the tunnel 101, the pressing members 104 and 105 having been removed and the upper stop 141 having been raised.

The first photograph $A_1$ is pressed by the thrust members 106 and 107 of the pressing member 104 against the stops 118 and 119 and also against the upper stop 141 which has been lowered.

The control button of the forks is in the position termed "forward" which corresponds to the FIGS. 7 to 11. The arm 122 is displaced by the plate 128 to the left of the drawing, the said plate acting upon the pusher member 116, so that the groove 125 comes into contact with the edge of the first photograph $A_1$. It should be observed that the face in question of the groove 125 should be perpendicular to the axis 115 although the arm 122 is slanted in relation to this axis.

Thus the photograph $A_1$ is pushed towards the stage 113 the entrance to which 114 causes the photograph to slant (FIG. 8), whereupon the plaque 120 pivots about its axis 121 and yields elastically.

Continuing the movement, the photograph $A_1$ is fed into the slide stage 113 as far as it will go.

Figure 9:
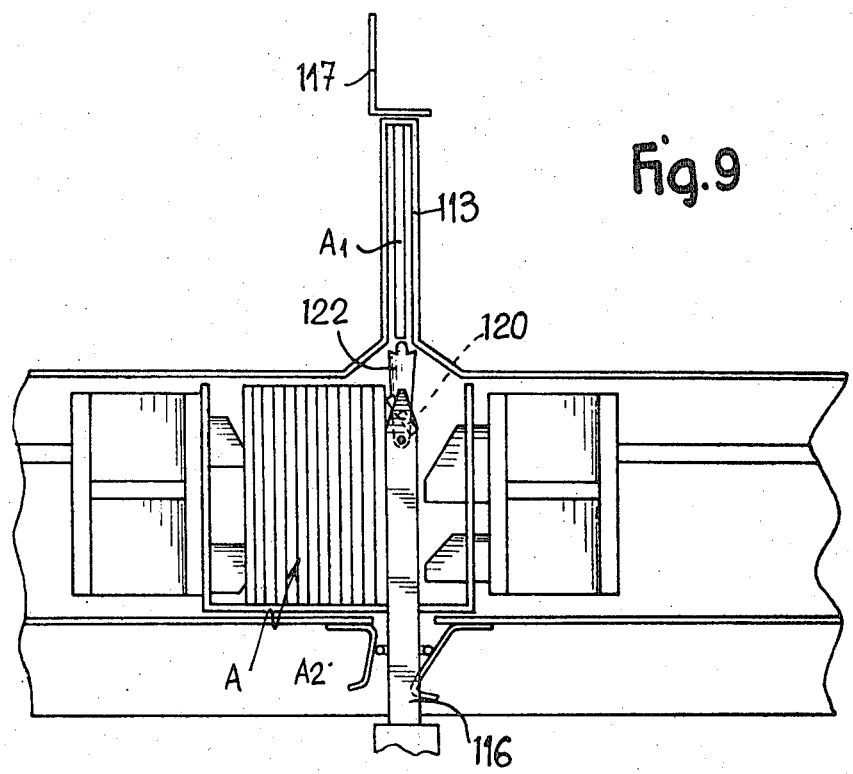

The plaque 120 returns to its original position and the next photograph $A_2$ takes the place of the first against the stops 118, 119 and 141 (FIG. 9).

Figure 10:
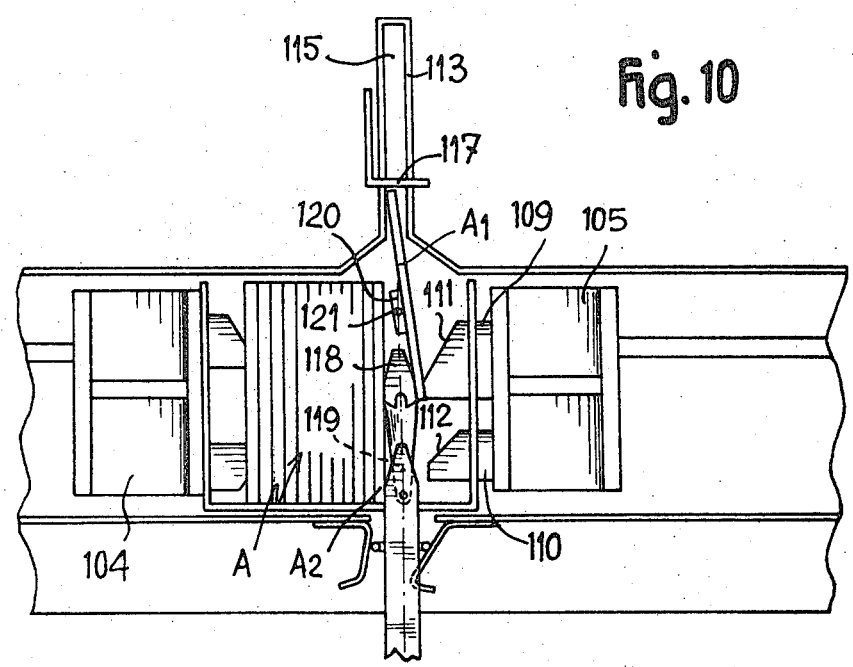

When the projection is finished, the pusher member is withdrawn and its return stop 117 pushes the photograph $A_1$, which on being withdrawn comes into contact with the plaque 120 disposed in such a way that the photograph $A_1$ is directed towards the other side of the axis 115 (FIG. 10).

It is thus obliged to slot between the stops 118 and 119 on the one hand and 109 and 110 on the other hand. It is the pointed edge of the stops 118 and 119 and the slanting faces 111 and 112 of the stops 109 and 110 which renders this insertion possible. The pressure member 105 then draws back as a result of the pressure exerted by the photograph $A_1$.

The position is then that shown in FIG. 11; from here the cycle can be repeated until all the photographs have been passed from the back to the front after having been projected.

Should the cassette have to be removed, it is only necessary to raise the stop 141 and to withdraw the presser members 104 and 105, regardless of the number of photographs located in front of or behind the axis 115.

In order to project again photographs which have already been shown, the control button is switched to the position termed "reverse".

In this event, the plaque pivots until it is slanted towards the front and not towards the back, being elastically displaced in this new direction.

In the same way, the prong 129 has freed the spring plate 127 while the prong 130 has pushed the plate 128 into its cancelled position.

When the pusher member is operated, the arm 122 is no longer acted upon by the plate 128 but by the plate 127, and, pivoting in this way about its axis 123, its groove 126 comes into contact with the photogrpah $A_1$, which has already been projected and which has earlier passed in front of the axis 115.

The photograph $A_1$ is brought back towards the stage 113 (FIG. 12) and causes the plaque 120 to pivot elastically.

When projection has taken place, the pusher member is withdrawn, its return stop 117 pushing against the photograph $A_1$.

As in the case of the "forward" operation described above, the photograph is directed by the plaque 120 towards the back this time and not towards the front since it has been disposed in the opposite direction.

The photograph $A_1$ thus returns to its original position in front of the photograph $A_2$.

This cycle can obviously be repeated as long as there are photographs in front of the axis 115.

A changeover can be made at any time from "forward" to "reverse" operation.

It goes without saying that the control of the different members may be effected manually as has been described, or mechanically using any known device.

The invention is not restricted only to the embodiments described and illustrated, but in fact covers all variations of the same.

I claim:

1. A slide projector comprising a tunnel adapted for receiving a magazine containing a stack of photographic slides, said projector having a projection axis arranged parallel to the tunnel, a pusher member movable transversally in relation to the tunnel opposite a projection station to move the slides from the magazine in the tunnel to a projection position on said axis and vice versa, means for moving the slides from one side to the other of said pusher member depending on the displacement direction of the pusher member whereby the slides can be longitudinally displaced in said magazine, said means comprising a member disposed in entirety in said tunnel in the path of longitudinal travel of the slides in the magazine and which is active elastically to yield forwards under the pressure of a slide reaching the projection station and to return to its original position behind the slide when the latter returns to the magazine from its projection position, said member by virtue of being disposed entirely within said tunnel being confined within the magazine when the latter is introduced into said tunnel, said member being positioned in said tunnel to hold the frontmost slide of the stack in a position rearwardly offset from the projection position, and means for pivoting the frontmost slide as it travels from the magazine into the projection position when the push member transversely displaces the slide to said projection position, said means being inactive when the slide is returned to the magazine from said projection position to enable said member to return to its original position and the slide to travel thereahead, said member in said original position being elastically thrust against the frontmost slide in the stack.

2. A projector according to claim 1 wherein said member disposed in the path of the slides comprises an elastically deformable leaf spring having a vertical fold, the slides passing behind said fold when moved from the magazine to the projection position and in front of the fold when moved from the projection position back into the magazine.

3. A projector according to claim 2, wherein said means for pivoting the frontmost slide comprises a stop having a locating edge which is pivotally and elastically mounted about an axis which is also vertical, in such a way as to yield backwards elastically under the pressure of a slide moving to its projection position and cause the slide to pivot as it travels to said projection position, said stop returning to its original position when the slide reaches its projection position, said stop then causing said slide to pivot forwards in such a way as to place it in front of said fold of the spring and behind the slides which have already been projected, when the slide is being returned to the magazine.

4. A projection according to claim 1 wherein said member and said means for pivoting the slide collectively comprises a single element mounted in the tunnel for pivotal movement around a vertical axis disposed in the plane of transverse movement of the push member, and elastic means acting on the single element to move the same to a position in which it has a vertical face oriented obliquely with respect to said plane.

5. A projection according to claim 4 wherein said single element is rectangular the larger sides of which are vertical, and which is symmetrical about its axis, the said single element having two positions of which one corresponds to pivotal displacement of the element towards the front of the tunnel, and the other to pivotal displacement of the element towards the back of the tunnel in relation to the plane of travel of the pusher member, the recall of the member being elastic and selectively either towards the front or towards the back, said pusher member comprising an arm which pivots on a vertical axis itself in the plane of travel of the pusher member and which is elastically recalled and is movable between two positions of which one corresponds to the displacement of the arm towards the back of the tunnel, the arm and single element having correlated positions.

6. A projector in accordance with claim 5 comprising a control mechanism for said single element and arm comprising two spring plates each of which has one end fixed to the projector and the other free to act upon said single element or the arm and each of which controls one direction of movement thereof, and a movable fork having two positions one of which corresponds to both the cancellation of the first spring plate and the action of the second, while the other position of the fork corresponds to the action of the first plate and the cancellation of the second.

* * * * *